US010855897B2

(12) United States Patent
Fredriksson et al.

(10) Patent No.: US 10,855,897 B2
(45) Date of Patent: Dec. 1, 2020

(54) IMAGING SYSTEM FOR A MOTOR VEHICLE

(71) Applicant: VEONEER SWEDEN AB, Vargarda (SE)

(72) Inventors: Peter Fredriksson, Linköping (SE); Niklas Rundqvist, Oxelösund (SE)

(73) Assignee: VEONEER SWEDEN AB, Vargarda (SE)

(*) Notice: Subject to any disclaimer, the term of this patent is extended or adjusted under 35 U.S.C. 154(b) by 0 days.

(21) Appl. No.: 16/493,796

(22) PCT Filed: Mar. 19, 2018

(86) PCT No.: PCT/EP2018/056865
§ 371 (c)(1),
(2) Date: Sep. 13, 2019

(87) PCT Pub. No.: WO2018/172273
PCT Pub. Date: Sep. 27, 2018

(65) Prior Publication Data
US 2020/0137276 A1  Apr. 30, 2020

(30) Foreign Application Priority Data
Mar. 20, 2017  (EP) ..................................... 17161814

(51) Int. Cl.
*H04N 5/225*  (2006.01)
(52) U.S. Cl.
CPC ......... *H04N 5/2257* (2013.01); *H04N 5/2252* (2013.01); *H04N 5/2253* (2013.01)
(58) Field of Classification Search
CPC ... H04N 5/2257; H04N 5/2252; H04N 5/2253
(Continued)

(56) References Cited

U.S. PATENT DOCUMENTS 2,894,425 A * 7/1959 Rapata .................. F16B 21/186
411/360
3,213,507 A * 10/1965 Leonard ................ F16B 5/065
24/662

(Continued)

FOREIGN PATENT DOCUMENTS

DE  10 2004 009920 A1  9/2005
EP   2 942 939 A1  11/2015
(Continued)

OTHER PUBLICATIONS

International Search Report and Opinion of PCT/EP2018/056865 dated May 30, 2018.
(Continued)

*Primary Examiner* — Michael Lee
(74) *Attorney, Agent, or Firm* — Dickinson Wright PLLC

(57) ABSTRACT

An imaging system for a motor vehicle, including a camera housing part (10) and at least one camera module (1) mounted at an attachment wall (12) of the camera housing part (10). The camera module (1) has a radially outwardly directed flange (5) with several radially outwardly directed protrusions (4), and a closed retainer ring (8). The protrusions (4) and/or the retainer ring (8) are elastically deformable, and the retainer ring (8) is attached by pushing it over the protrusions (4) under elastic deformation of the retainer ring (8) and/or the protrusions (4) to an attachment position. The camera module (1) is attached at the attachment wall (12) by clamping the attachment wall (12) between the retainer ring (8) and the flange (5) of the camera module (1).

9 Claims, 2 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 5,768,649 | A | * | 6/1998 | Pearson ................. G03B 19/04 359/819 |
| 9,762,783 | B2 | | 9/2017 | Apel et al. |
| 2001/0001199 | A1 | * | 5/2001 | Sabounjian ............. D06F 57/08 211/202 |
| 2007/0041725 | A1 | * | 2/2007 | Neumann ............. B60S 1/0822 396/419 |
| 2007/0188893 | A1 | | 8/2007 | Cywinski et al. |
| 2012/0037820 | A1 | * | 2/2012 | Komi ..................... G03B 17/14 250/566 |
| 2012/0298063 | A1 | * | 11/2012 | Schieszl ................ F16L 37/113 123/184.21 |
| 2015/0326760 | A1 | | 11/2015 | Knutsson et al. |

FOREIGN PATENT DOCUMENTS

| | | | |
|---|---|---|---|
| JP | 2010-081293 | A | 4/2010 |
| JP | 2012144115 | A | 8/2012 |
| KR | 20120016430 | A | 2/2012 |
| KR | 101 705 525 | B1 | 2/2017 |
| KR | 101705525 | B1 | 2/2017 |
| WO | WO 2014/095130 | A1 | 6/2014 |

OTHER PUBLICATIONS

Hajime, Nagae, Computer Translation of JP2012144115, published Aug. 2, 2012.
Gil, Kwon Young, Computer Translation of KR101705525, published Feb. 13, 2017.

* cited by examiner

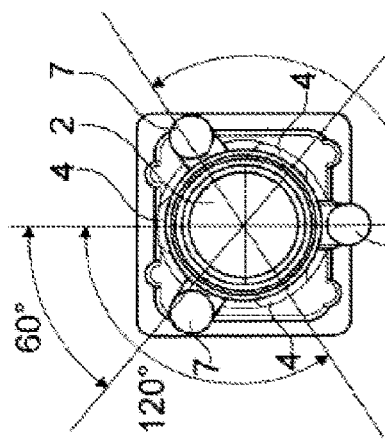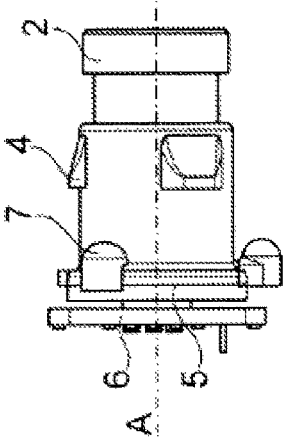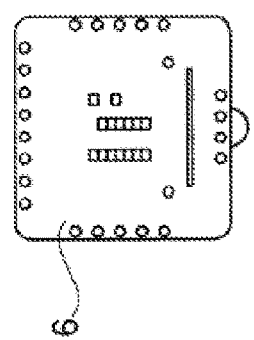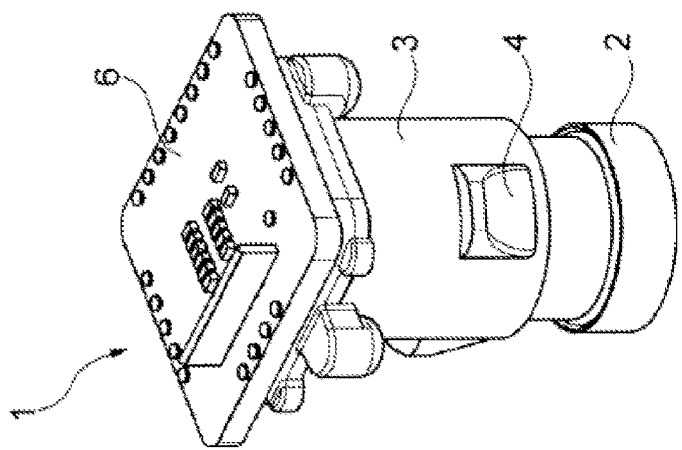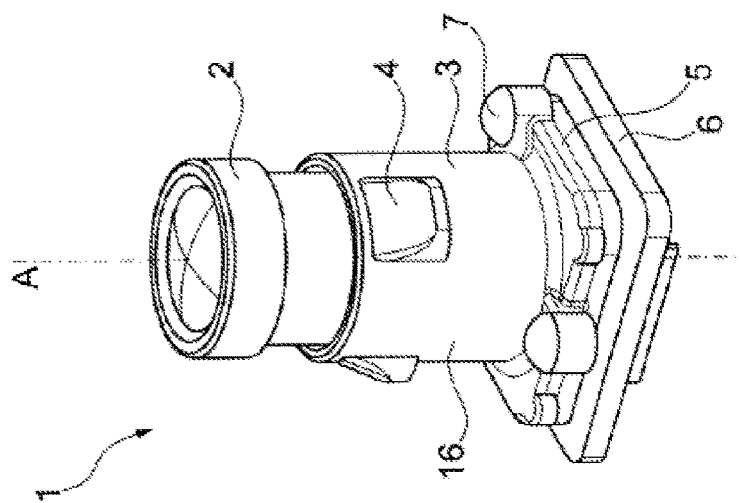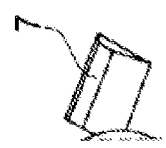

IMAGING SYSTEM FOR A MOTOR VEHICLE

CROSS-REFERENCE TO RELATED APPLICATIONS

This application is a 35 U.S.C. § 371 national phase of PCT International Application No. PCT/EP2018/056865, filed Mar. 19, 2018, which claims the benefit of priority under 35 U.S.C. § 119 to European Patent Application No. 17161814.3, filed Mar. 20, 2017, the contents of which are incorporated herein by reference in their entirety.

FIELD OF THE INVENTION

The invention relates to an imaging system for a motor vehicle.

BACKGROUND

An imaging system for a motor vehicle including the features of prior art systems is known for example from the EP 2 942 939 A1.

The imaging system includes a camera housing part and at least one camera module to be mounted at an attachment wall of the camera housing part, wherein the camera module includes a lens objective, a lens holder holding the lens objective, an image sensor and a back plate holding the image sensor.

The camera module is attached by first and second rotation locking components at the camera housing part, which are cooperating with each other. The first rotation locking components may be realized for example by two pins and the second rotation locking components may be realized by two bores in the camera housing part into which the pins may be inserted. Therefore, it is prevented that the camera module may change his position or orientation with respect to a predefined roll angle after the attachment at the camera housing part and after the attachment of the imaging system at a vehicle.

The attachment of the camera module in the camera housing part is realized in accordance with the prior art by several assembly steps. First of all, the camera module needs to be positioned in a predefined position, in which the bores of the camera module and the camera housing part are aligned. In a second and third step, the two pins need to be inserted into the different bores. As the camera module is fixed via two pins, the orientation of the camera module versus the predefined roll angle is fixed after the attachment. Nevertheless, it is possible that the orientation of the camera module may deviate from the predefined orientation because of tolerances or when one of the pins is not mounted properly in one of the bores. Furthermore, the two pins may be mounted with different mounting forces which may result in a tilting of the camera module.

SUMMARY

With respect to this prior art it is the object of the invention to provide an image system in which the attachment of the camera module in the camera housing part is further facilitated and which enables furthermore an improved accuracy of the attachment and orientation of the camera module with respect to a predefined mounting position and orientation.

According to a feature of embodiments of the invention it is suggested that the camera module is provided with a radially outwardly directed flange, with several radially outwardly directed protrusions and with a closed retainer ring, wherein the protrusions and/or the retainer ring are elastically deformable, and the retainer ring is attached by pushing it over the protrusions under elastic deformation of the retainer ring and/or the protrusions to an attachment position. The camera module is attached at the attachment wall by clamping the attachment wall between the retainer ring and the flange of the camera module when the retainer ring is in the attachment position.

The suggested imaging system according to the present invention provides several advantages. First of all, there is only one part, the retainer ring, needed for the attachment. The assembly may be further facilitated to only two steps, inserting of the camera module into the opening of the camera housing and pushing the retainer ring over the camera module to the attachment position. Furthermore, the inventive solution enables an attachment in a single opening without additional bores or the like with equally distributed clamping forces between the retainer ring, the attachment wall and the flange. Therefore, the maximum load of the camera module and the camera housing in the areas of the attachment may be reduced, which results also in a reduced influence of the attachment forces to the final orientation of the camera module in the attachment position. Therefore, the invention enables an attachment of the camera module with a higher accuracy with respect to a predetermined attachment position and orientation.

Furthermore, the protrusions may be formed in a conical shape with an increasing thickness in the direction to the flange. The advantage of this embodiment is that the retainer ring may be easily pushed over the camera module while the elastic deformation of retainer ring and/or the protrusions is increasing continuously during the attachment movement until the retainer ring clips behind the protrusions to the attachment position.

Furthermore, the flange and/or the attachment wall are provided preferably with three centering surfaces arranged at the side facing towards the other part, which may be provided in, for example, a conical, a spherical or a flat shape. First of all, the use of three centering surfaces is preferred as three centering surfaces define a plane and the camera module may thereby not perform any tilting movements versus the camera housing part.

Furthermore, the centering surfaces may have for example conical or spherical shapes which have a centering effect to a predefined position in radial as well as in circumferential directions because of their shape. Alternatively, the centering surface may have also a flat shape which may have a centering effect in combination with the other centering surfaces. The flat surface may have a very precisely worked or manufactured geometry and orientation and may be oriented in an angle different from 90 degrees to the length axis of the camera module to urge the camera module in a predefined direction.

A very equal load distribution with a low maximum of load with a precise orientation of the camera module may be achieved when the centering surfaces are arranged in angles of 120 degrees versus each other with respect to a length axis of the camera module in the mounted position.

Furthermore, it is preferred that the camera module may include three protrusions which are arranged in angles of 120 degrees with respect to each other related to a length axis of the camera module, which enables an equal distribution of the acting clamping forces in the retainer ring and the attachment wall.

Furthermore, it is preferred that the three protrusions and the three centering surfaces are arranged in angles of 60 degrees versus each other with respect to the length axis of the camera module. The three protrusions are arranged in the view onto the front side of the camera module between the centering surfaces. So the attachment wall is loaded together with the retainer ring in abutment points distributed in angles of approximately 60 degrees in circumferential direction with respect to the length axis of the camera module, which results in a further equalized load distribution and an attachment with a very high accuracy related to a predefined position and orientation is possible.

Furthermore, it is suggested that the retainer ring includes a tubular part and a collar extending radially inwardly from the tubular part. The retainer ring may act thereby additionally as a protection for the camera module by surrounding the camera module partially and especially the lens objective at the front side with the tubular part. The retainer ring is only engaging with the collar between the protrusions and the attachment wall, which fixes the camera module in the camera housing part, wherein the tubular part is not loaded. Furthermore, the assembly is facilitated because the retainer ring may be handled easier by grasping the retainer ring at the tubular part from the side opposing the collar and pushing it over the camera module and the protrusions with the collar. The collar is arranged at the end of the tubular part, which is faced towards the attachment wall in the mounted position, so that the retainer ring is pushed in a first step with the collar over the protrusions when mounting the camera module at the camera housing via the retainer ring and moved over the protrusions until the final attachment position is reached.

According to a further preferred embodiment it is suggested that the camera module includes a cylindrical shape, and the retainer includes a circular ring shape. The retainer ring is therefore loaded by an equally distributed load when attached at the camera housing and the assembly is facilitated since the retainer ring may be attached independent from its circumferential orientation.

BRIEF DESCRIPTION OF THE DRAWINGS

In the following the invention shall be illustrated on the basis of a preferred embodiment with reference to the accompanying drawings, wherein:

FIG. 1A to 1E shows a camera module from different sides;

FIG. 2A to 2C shows different centering surfaces with different geometries; and

DETAILED DESCRIPTION

Figure 3A:
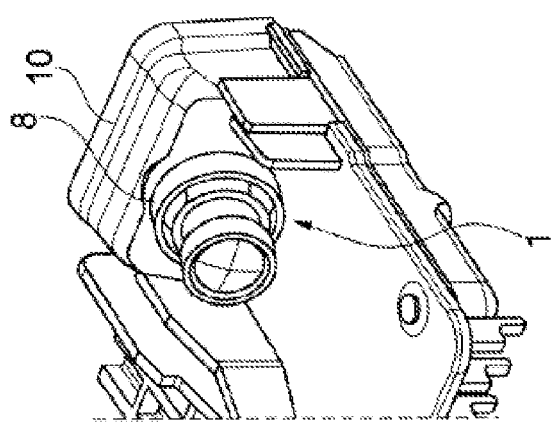
FIG. 3A to 3C shows an imaging system with a camera housing part and the camera module in different views.

In the FIGS. 1A to 1E it is shown a camera module 1 as a preassembled module including as basic components a lens objective 2, a lens holder 3 holding the lens objective 2 and a printed circuit board (PCB) 6 fixed at the lens holder 3. The lens objective 2 may be screwed into the lens holder 3 and may be provided as a stack of several single lenses. The PCB 6 may include a not shown image sensor which is positioned in a predefined position versus the lens objective 2, so that the light entering through the lenses of the lens objectives 2 is directed onto the image sensor from a predefined direction. The lens holder 3 can be seen as the central part of the camera module 1 as it serves to fix the lens objective 2 and also to fix the PCB 6, so both parts are aligned versus each other because of the fixation at a common part.

The lens holder 3 is designed with a cylindrical tube body 16 and a square shaped flange 5, which extends radially in outward direction from the tube body 16 and is arranged at the end of the tube body 16 facing towards the PCB 6. Furthermore, the lens holder 3 is provided with three protrusions 4 arranged in 120 degrees versus each other with respect to a length axis A of the camera module 1. The protrusions 4 are designed with a conical surface having an increasing thickness in the direction towards the flange 5. The flange 5 is provided with three centering surfaces 7 arranged at the side facing towards the protrusions 4, which are also arranged in 120 degrees versus each other related to the length axis A of the camera module 1. Furthermore, an elastomeric seal 14 is provided between the camera module 1 and the camera housing part 10 like shown in FIG. 3C. In the shown embodiment there are provided three protrusions 4 and three centering surfaces 7 arranged in angles of 120 degrees, which is preferred as they define therefore two planes and the camera module 1 may not tilt or in other words it is assured that the camera module 1 is abutting with three abutment surfaces at the retainer ring and with three abutment surfaces at the attachment wall. If the attachment with more or less abutment surfaces is reasonable it is also possible, wherein they may be arranged also in other and not identical angles.

The centering surfaces 7 are designed spherical but may also be designed as conical surfaces like for example in the FIGS. 2A and 2B or as flat surfaces like shown in FIG. 2C. The centering surfaces 7 are designed in a shape which urges the camera module 1 to a predefined position. Therefore, the centering surfaces 7 are worked to a very precise geometry extending from the flange 5 in the direction of the length axis A of the camera module 1 towards the protrusions 4.

Figure 3B:
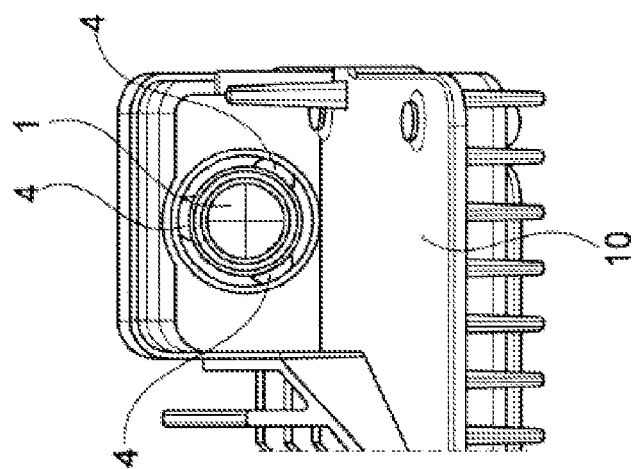
Figure 3C:
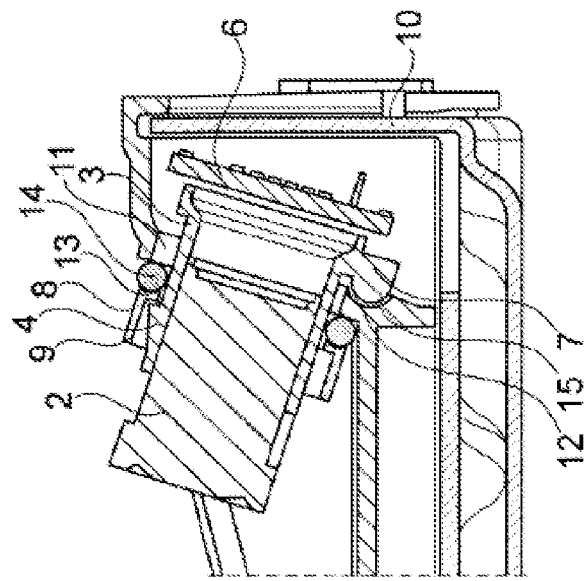

In the FIGS. 3A to 3C it is shown the imaging system with a camera housing part 10 and the camera module 1 attached thereto. The camera module 1 is arranged in an opening 11 of an attachment wall 12 of the camera housing part 10 and fixed by a retainer ring 8 like described in the following. The camera module 1 is inserted with the lens objective 2 in a first step from the back side of the attachment wall 12 into the opening 11. In a second step, the retainer ring 8 is pushed from the front side over the lens objective 2 and the tube body 16 of the lens holder 3. The retainer ring 8 includes a tubular part 9 and a radially inwardly directed collar 13 like shown in FIG. 3C. Furthermore, the retainer ring 8 and/or the protrusions 4 are designed either by the choice of a special material and/or by designing a special geometry with for example weakened sections in an elastically deformable manner, so that the retainer ring 8 may be pushed with the collar 13 under elastic deformation of one of these parts over the protrusions 4 and snapping with the collar 13 behind the backside of the protrusions 4 to the attachment position. The thickness of the retainer ring 8 or in this special case of the collar 13 in direction of the length axis A is designed so that the addition of the thickness of the attachment wall 12, the thickness of the collar 13 including the thickness of the elastomeric seal 14 is approximately identical or slightly greater than the distance between the flange 5 and the side of the protrusions 4 facing towards the flange 5 like shown in FIG. 3C. Therefore, the seal 14 is loaded by a pressure force and deformed when the camera module 1 is fixed in the mounting position by the retainer ring 8 to tighten the opening 11 of the attachment wall 12. The protrusions 4 are designed with conical surface with in axial direction towards the flange 5 increasing thickness, wherein the conical outer surfaces may also be shaped spherical in circumferential direction. Therefore, the retainer ring 8 and/or the protrusions 4 are deformed continuously increasing when the retainer ring 8 is pushed over the protrusions 4, which facilitates the mounting process.

The attachment wall 12 is provided with three recesses 15 having a corresponding shape relating to the shape of the centering surfaces 7, so that the camera module 1 may dive with the centering surfaces 7 into the recesses 15 to a predetermined position in axial as well as in circumferential direction like shown in FIG. 3C. The centering surfaces 7 as well as the protrusions 4 are arranged in angles of 120 degrees versus each other related to the length axis A. The arrangement of the protrusions 4 and the centering surfaces 7 are turned to each other by 60 degrees, so that the protrusions 4 are arranged in angles of 60 degrees to the neighbored centering surfaces 7 in the projection in direction of the length axis A like shown in FIG. 1C. When the camera module 1 is mounted in the attachment position, the centering surfaces 7 are pressed into the recesses 15 and the protrusions 4 are pressed with their end faces against the retainer ring 8 and the retainer ring 8 finally against the attachment wall 12, so that camera module 1 is attached at the camera housing part 10 by clamping the attachment wall 12 between the retainer ring 8 and the flange 5 of the lens holder 3. As the protrusions 4 and the centering surfaces 7 are arranged in angles of 60 degrees in circumferential direction, the camera module 1 is fixed with an equally distributed clamping force at the attachment wall 12 of the camera housing part 10.

The mounting process of the camera module 1 needs therefore only two steps, inserting of the camera module 1 into the opening and pushing the retainer ring 8 over the lens holder 3 to the attachment position. As the PCB 6 with the image sensor arranged thereon is fixed at the lens holder 3 and the lens objective 2 is also fixed at the lens holder, the lens objective 2 has an orientation and position relating to the image sensor which is independent from the mounting of the camera module 1 at the camera housing part 10. Furthermore, the attachment is realized via clamping forces applied via six abutment points, three at the retainer ring 8 and three at the attachment wall 12, which results in a very precise attachment of the camera module 1 at the camera housing part 10 related to the predetermined position.

Furthermore, the final attachment position of the camera module 1 is also defined by the centering surfaces 7 engaging into the recesses 15 of the attachment wall 12, which urges the camera module 1 into a predefined radial position and circumferential position. Therefore, no further adjustment of the camera module 1 is needed.

While the above description constitutes the preferred embodiment of the present invention, it will be appreciated that the invention is susceptible to modification, variation and change without departing from the proper scope and fair meaning of the accompanying claims.

The invention claimed is:

1. An imaging system for a motor vehicle, comprising
a camera housing part and at least one camera module to be mounted at an attachment wall of the camera housing part,
the camera module is provided with a radially outwardly directed flange and with a plurality of radially outwardly directed protrusions, and
a closed retainer ring is provided, wherein
the protrusions or the retainer ring is elastically deformable, and
the retainer ring is attached by pushing it over the protrusions under elastic deformation of the retainer ring or the protrusions to an attachment position,
the camera module is attached at the attachment wall by clamping the attachment wall between the retainer ring and the flange of the camera module when the retainer ring is in the attachment position.

2. An imaging system according to claim 1 wherein, the protrusions comprise a conical shape with an increasing thickness in the direction to the flange.

3. An imaging system according to claim 1 further comprising, the flange is provided with three centering surfaces arranged at the side facing towards the attachment wall.

4. An imaging system according to claim 3 wherein, the centering surfaces comprise a conical, a spherical or a flat shape.

5. An imaging system according to claim 3 further comprising, the centering surfaces are arranged in angles of 120 degrees versus each other with respect to a length axis of the camera module.

6. An imaging system according to claim 5 wherein, the camera module comprises three protrusions which are arranged in angles of 120 degrees with respect to each other related to the length axis of the camera module.

7. An imaging system according to claim 6 further comprising, the three protrusions and the three centering surfaces are arranged in angles of approximately 60 degrees versus each other with respect to the length axis of the camera module.

8. An imaging system according to claim 1 wherein, the retainer ring comprises a tubular part and a collar extending radially inwardly from the tubular part.

9. An imaging system according to claim 1 further comprising wherein, the camera module forms a cylindrical shape, and the retainer ring forms a circular ring shape.

* * * * *